United States Patent
Goetz et al.

(10) Patent No.: US 9,772,828 B2
(45) Date of Patent: Sep. 26, 2017

(54) STRUCTURAL IDENTIFICATION OF DYNAMICALLY GENERATED, PATTERN-INSTANTIATION, GENERATED CLASSES

(71) Applicant: Oracle International Corporation, Redwood City, CA (US)

(72) Inventors: Brian Goetz, Williston, VT (US); John R. Rose, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/660,177

(22) Filed: Mar. 17, 2015

(65) Prior Publication Data

US 2015/0301837 A1 Oct. 22, 2015

Related U.S. Application Data

(60) Provisional application No. 61/982,802, filed on Apr. 22, 2014.

(51) Int. Cl.
*G06F 9/45* (2006.01)
*G06F 9/445* (2006.01)
*G06F 9/44* (2006.01)

(52) U.S. Cl.
CPC .......... *G06F 8/443* (2013.01); *G06F 8/315* (2013.01); *G06F 8/437* (2013.01); *G06F 8/70* (2013.01);
(Continued)

(58) Field of Classification Search
None
See application file for complete search history.

(56) References Cited

U.S. PATENT DOCUMENTS 5,421,016 A * 5/1995 Conner .................. G06F 9/443
712/E9.084
5,628,016 A 5/1997 Kukol
(Continued)

FOREIGN PATENT DOCUMENTS

WO 2004102303 11/2004

OTHER PUBLICATIONS

Sunil Soman, et al., "Efficient and General On-Stack Replacement for Aggressive Program Specialization", 2006 International Conference on Programming Languages and Compilers (PLC'06), Jun. 26-29, pp. 1-9, Las Vegas, NV.
(Continued)

*Primary Examiner* — Chameli Das
(74) *Attorney, Agent, or Firm* — Robert C. Kowert; Meyertons, Hood, Kivlin, Kowert & Goetzel, P.C.

(57) ABSTRACT

Structural identification of dynamically generated, pattern-instantiation classes may be utilized using structural descriptions. Instead of describing classes only by name, and using that name to locate that class, a class may be referred to by a generator function and arguments to the generator function. A structural description may specify the generator function and the parameters. In addition, a structural description of a class may be used as a parameter to a generator function specified by another structural description. A structural description may be used similarly to a class name for virtually any situation in which a class name may be used. Classes may be compared using their structural descriptions. For example, two structural descriptions may be considered to be the same class if they specify the same generator function and parameters.

20 Claims, 6 Drawing Sheets

(52) U.S. Cl.
CPC .............. *G06F 8/71* (2013.01); *G06F 9/4428* (2013.01); *G06F 9/4433* (2013.01); *G06F 9/44521* (2013.01); *G06F 8/24* (2013.01)

(56) References Cited

U.S. PATENT DOCUMENTS

| | | | | |
|---|---|---|---|---|
| 5,630,131 | A * | 5/1997 | Palevich | G06F 9/4448 715/700 |
| 5,923,878 | A * | 7/1999 | Marsland | G06F 9/44521 717/139 |
| 6,226,788 | B1 * | 5/2001 | Schoening | H04L 41/0213 709/203 |
| 6,230,314 | B1 * | 5/2001 | Sweeney | G06F 8/4435 717/108 |
| 6,279,008 | B1 * | 8/2001 | Tung Ng | G06F 17/30607 |
| 6,360,360 | B1 * | 3/2002 | Bates | G06F 8/443 717/130 |
| 6,513,152 | B1 * | 1/2003 | Branson | G06F 9/4428 707/999.103 |
| 6,757,890 | B1 * | 6/2004 | Wallman | G06F 8/43 711/E12.006 |
| 6,968,540 | B2 * | 11/2005 | Beck | G06F 9/443 712/E9.084 |
| 7,000,219 | B2 | 2/2006 | Barrett et al. | |
| 7,162,716 | B2 | 1/2007 | Glanville et al. | |
| 7,665,062 | B1 * | 2/2010 | Bauer | G06F 8/34 717/105 |
| 8,079,023 | B2 | 12/2011 | Chen | |
| 8,250,528 | B2 | 8/2012 | Meijer et al. | |
| 8,438,551 | B2 | 5/2013 | Tonkin et al. | |
| 8,677,312 | B1 | 3/2014 | Braun et al. | |
| 8,863,079 | B2 | 10/2014 | Darcy et al. | |
| 2002/0032900 | A1 * | 3/2002 | Charisius | G06F 8/20 717/106 |
| 2003/0018958 | A1 | 1/2003 | Wallman et al. | |
| 2003/0079049 | A1 | 4/2003 | Sokolov | |
| 2003/0079201 | A1 | 4/2003 | Sokolov | |
| 2004/0006762 | A1 * | 1/2004 | Stewart | G06F 8/36 717/106 |
| 2004/0221228 | A1 | 11/2004 | Day et al. | |
| 2005/0027507 | A1 * | 2/2005 | Patrudu | G06F 17/2785 704/1 |
| 2005/0055682 | A1 | 3/2005 | Gadre et al. | |
| 2005/0065942 | A1 * | 3/2005 | Diab | G06F 8/24 |
| 2005/0193269 | A1 * | 9/2005 | Haswell | G06F 11/3684 714/38.13 |
| 2006/0048024 | A1 * | 3/2006 | Lidin | G01R 31/31813 714/724 |
| 2006/0143597 | A1 | 6/2006 | Alaluf et al. | |
| 2006/0251125 | A1 * | 11/2006 | Goring | H04L 67/26 370/503 |
| 2007/0033273 | A1 * | 2/2007 | White | G06F 8/30 709/223 |
| 2007/0111185 | A1 * | 5/2007 | Krebs | G09B 5/00 434/350 |
| 2007/0256069 | A1 * | 11/2007 | Blackman | G06F 9/44536 717/170 |
| 2008/0033968 | A1 | 2/2008 | Quan et al. | |
| 2008/0040360 | A1 | 2/2008 | Meijer et al. | |
| 2008/0275910 | A1 * | 11/2008 | Molina-Moreno | G06F 8/35 |
| 2008/0294740 | A1 * | 11/2008 | Grabarnik | G06F 11/0709 709/206 |
| 2009/0125881 | A1 * | 5/2009 | Susarla | G06F 9/4428 717/110 |
| 2009/0271771 | A1 * | 10/2009 | Fallows | G06F 9/45516 717/137 |
| 2010/0138778 | A1 * | 6/2010 | Dewan | G06F 9/4443 715/789 |
| 2010/0223593 | A1 * | 9/2010 | Eldridge | G05B 15/02 717/105 |
| 2010/0223606 | A1 | 9/2010 | Park et al. | |
| 2010/0306739 | A1 * | 12/2010 | Schneider | G06F 17/30879 717/116 |
| 2011/0067013 | A1 | 3/2011 | Frost et al. | |
| 2012/0005660 | A1 | 1/2012 | Goetz et al. | |
| 2012/0185450 | A1 * | 7/2012 | Marmigere | G06F 9/44536 707/695 |
| 2012/0260230 | A1 * | 10/2012 | Choudhary | G06F 11/3616 717/105 |
| 2013/0305230 | A1 * | 11/2013 | Inoue | G06F 8/443 717/153 |
| 2015/0106797 | A1 * | 4/2015 | Balasubramanian | G06F 8/4432 717/153 |
| 2015/0154164 | A1 * | 6/2015 | Goldstein | G06F 17/2288 715/229 |

OTHER PUBLICATIONS

Design Pattern Instantiation Directed by Concretization and Specialization—Peter Kajsa—ComSIS vol. 8, No. 1, 2011 (DOI:10.2298/CSIS091212032K), pp. 1-32.

International Search Report and Written Opinion from PCT/US2015/026947, Date of Mailing Jul. 6, 2015, Oracle International Corporation, pp. 1-11.

Eric Allen, et al., "Efficient Implementation of Run-Time Generic Types for Java", Mar. 3, 2006, Retrieved from the Internet: URL: http://web.archive.org/web/20060303102205/http://www.cs.rice.edu/javaplt/paper/wcgp2002.pdf, pp. 1-28.

Robert Cartwright, et al., "Compatible Genericity with Run-Time Types for the Java Programming Language", Principles of Programming Languages, ACM, Oct. 1, 1998, pp. 201-215.

Joseph A. Bank, et al., "Parameterized Types and Java", May 1996, Retrieved from the Internet: URL: http://publications.csail.mit.edu/lcs/pubs/pdf/MIT-LCS-TM-553.pdf, pp. 1-19.

"Common Language Infrastructure (CLI) Partitions I to VI," 6th Edition / Jun. 2012, ECMA International, Standard ECMA-335, pp. 1-574.

International Search Report and Written Opinion from PCT/US2015/026965, Oracle International Corporation, dated Nov. 6, 2015, pp. 1-11.

Gamma E et al: "Design Patterns: Elements of Reusable Object-Oriented Software", Sep. 1, 1999, pp. 81-228, XP882287989, p. 175-p. 184.

Julian Dragos et al: "Compiling generics through user-directed type specialization", Proceedings of the 4th Workshop on the Implementation, Compilation, Optimization of Object-Oriented Languages and Programming Systems, ICOOOLPS '09, Jul. 6, 2009 (Jul. 6, 2009), pp. 42-47, XP055195664, New York, New York, USA DOI: 10.1145/1565824.1565830, ISBN: 978-1-60-558541-3, p. 43-p. 46.

Martin Buchi et al: "Generic Wrappers" In: "Advances in Communication Networking: 20th EUNICE/IFIP EG 6.2, 6.6 International Workshop, Rennes, France, Sep. 1-5, 2014, Revised Selected Papers", May 12, 2000 (May 12, 2000), Springer Verlag, DE 032548, XP055223226, ISSN: 0302-9743, ISBN: 978-3-642-36699-4, vol. 1850, pp. 201-225, DOI: 10.1007/3-540-45102-1 10, p. 202-p. 219.

Evered M et al: "Genja—a new proposal for parameterised types in Java", Technology of Object-Oriented Languages and Systems, 1997. Tools 25, Proceedings Melbourne, VIC., Australia Nov. 24-28, 1997, Los Alamitos, CA, USA,IEEE Comput. Soc, US, Nov. 24, 1997 (Nov. 24, 1997), pp. 181-193, XP010286322, ISBN: 978-0-8186-8485-2 p. 182-p. 188.

Gilad Bracha, "Generics in the Java Programming Language", Jul. 5, 2004, pp. 1-23.

Michael Johnson, "New Features of C#", CSCI 5448, 2012, p. 5.

Alessandra Warth, et al., "Statically Scoped Object Adaptation with Expanders", ACM OOPSLA'06, Oct. 22-26, 2006, pp. 1-19.

International Search Report and Written Opinion in PCT/US2015/026962, Date of Jul. 2, 2015, Oracle International Corporation, pp. 1-12.

Andrew Myers, et al., "Parameterized Types for Java", Conference Record of POPL '97: 24th ACM SIGPLANSIGACT Symposium on Principles of Programming Language, Jan. 15-17, 1997, pp. 132-145.

(56) References Cited

OTHER PUBLICATIONS

Atanas Radenski, et al., "The Java 5 Gererics Comprise Orthogonality to Keep Compatibility", Journal of Systems & Software, Nov. 1, 2008, pp. 2069-2078, vol. 81, No. 11.
Brian Goetz, "State of the Specialization", Retrieved from the Internet: http://web.archive.org/web/20140717190322/http://cr.openjdk.java.net/briangoetz/valhalla/specialization.html, pp. 1-7.
"Templates, C++ FAQ", Jan. 15, 2014, Retrieved from the Internet: URL:http://web.archive.org/web/20140115082944/http://isocpp.org.wiki/faq/templates, pp. 2-27.
U.S. Appl. No. 14/660,143, filed Mar. 17, 2015, Brian Goetz et al.
U.S. Appl. No. 14/660,604, filed Mar. 17, 2015, Brian Goetz et al.
U.S. Appl. No. 14/692,590, filed Apr. 21, 2015, Brian Goetz et al.
U.S. Appl. No. 14/692,592, filed Apr. 21, 2015. Brian Goetz et al.
U.S. Appl. No. 14/692,593, filed Apr. 21, 2015, Brian Goetz et al.
U.S. Appl. No. 14/692,601, filed Apr. 21, 2015, Brian Goetz et al.
International Search Report and Written Opinion from PCT/US2015/026966, Date of Mailing Sep. 1, 2015, Oracle International Corporation, pp. 1-11.
Martin J. Cole, et al., "Dynamic compilation of C++ template code", Scientific Programming vol. 11, No. 4, Jan. 1, 2003, pp. 321-327.
Eyvind W. Axelsen, et al., "Groovy Package Templates", Proceeding of the 5th Symposium on Dynamic Languages, Oct. 26, 2009, pp. 15-26.
Lubomir Bourdev, et al., "Efficient run-time dispatching in generic programming with minimal code bloat", Science of Computer Programming, vol. 76, No. 4, Apr. 1, 2011, pp. 243-257.
Brian Goetz, "ClassDynamic Jun. 2014: Initial Draft", Retrieved from the Internet: URL: http://web.archive.org/web/20140801102025/http://cr.openjdk.java.net/briangoetz/valhalla/spec-classdyn.html, Jun. 2014, pp. 1-3.
Ernst, "Inheritance versus Parameterization", ACM, 2013, pp. 26-29.
Nicolas Stucki, et al., "Bridging Islands of Specialized Code using Marcos and Reified Types", ACM, Scala '13, 2013. pp. 1-4.
Nystrom et al., "Genericity through Constrained Types", 2009, IBM Watson Research Center, 18 pages.
Shailendra Chauhan, "Difference Between Generalization and Specialization", 2013, retrieved from http://www.dotnet-tricks.com/Tutorial/oops/169c211013-Difference-Between-Generalization-and-Specialization.html, 6 pages.
Kiezun et al., "Refactoring for Parameterizing Java Classes", IEEE, 2007, pp. 1-10.
Selifonov et al., "On the Algorithm for Specializing Java Programs with Generic Types", 2007, University of Minnesota Morris,16 pages.

* cited by examiner

STRUCTURAL IDENTIFICATION OF DYNAMICALLY GENERATED, PATTERN-INSTANTIATION, GENERATED CLASSES

PRIORITY INFORMATION

This application claims benefit of priority to the following provisional application, which is hereby incorporated by reference in its entirety: Ser. No. 61/982,802 filed Apr. 22, 2014 titled Specializing Parametric Types with Primitive Type Arguments.

BACKGROUND

The present invention relates generally to software development and more specifically to various aspects of language development within any of various programming languages, such as a platform-independent, object-oriented programming language, as one example.

In object oriented programming, classes are traditionally referred to nominally. If two class references have the same name (and have the same provenance, such as being loaded from the same class loader or repository), they are considered the same. Additionally, it is a common development technique to generate classes by instantiating a pattern or template. For instance, such instantiations may take the form of hand-coding by a developer, or mechanical template expansion by a tool. While classes generated based on a pattern or template may provide more expressiveness and readability, mechanical template instantiation often relies on brittle mappings between a description of what a class does and a name for the class frequently exposing ugly machine-generated "mangled" names to the user while simultaneously throwing away information in the process (e.g., that the class Account$ImmutableWrapper is the result of applying the "immutable wrapper" template to the type "Account"). If the mapping between the description and the class name changes, two class references with the same name may be binary incompatible because they may no longer perform the same.

SUMMARY

Structural identification of dynamically generated, pattern-instantiation classes may be utilized using structural descriptions, such as to extend the way classes are described in a runtime environment. Instead of describing classes only by name, and using that name to locate that class (e.g., in a class file on disk), a class may be referred to as a combination of a code generator function and possibly some arguments. In other words, in some embodiments, a class may be described by a structural description specifying a generator function and possibly one or more parameters to that generator function. A structural description may, in some embodiments, be considered (e.g., may be used instead of) a class name for virtually any situation in which a class name may be used (e.g., argument type, return type, field type, supertype, operand of instanceof or cast operator, etc.).

For example, a compiler and/or virtualized runtime environment may be configured to allow descriptions of classes using structural descriptions. Additionally, structural descriptions may be considered to encode a recipe for generating the class. Classes may be compared using their structural descriptions. More generally, two class descriptions can be compared for equality in a structural, mechanical manner.

DETAILED DESCRIPTION OF EMBODIMENTS

Figure 1:
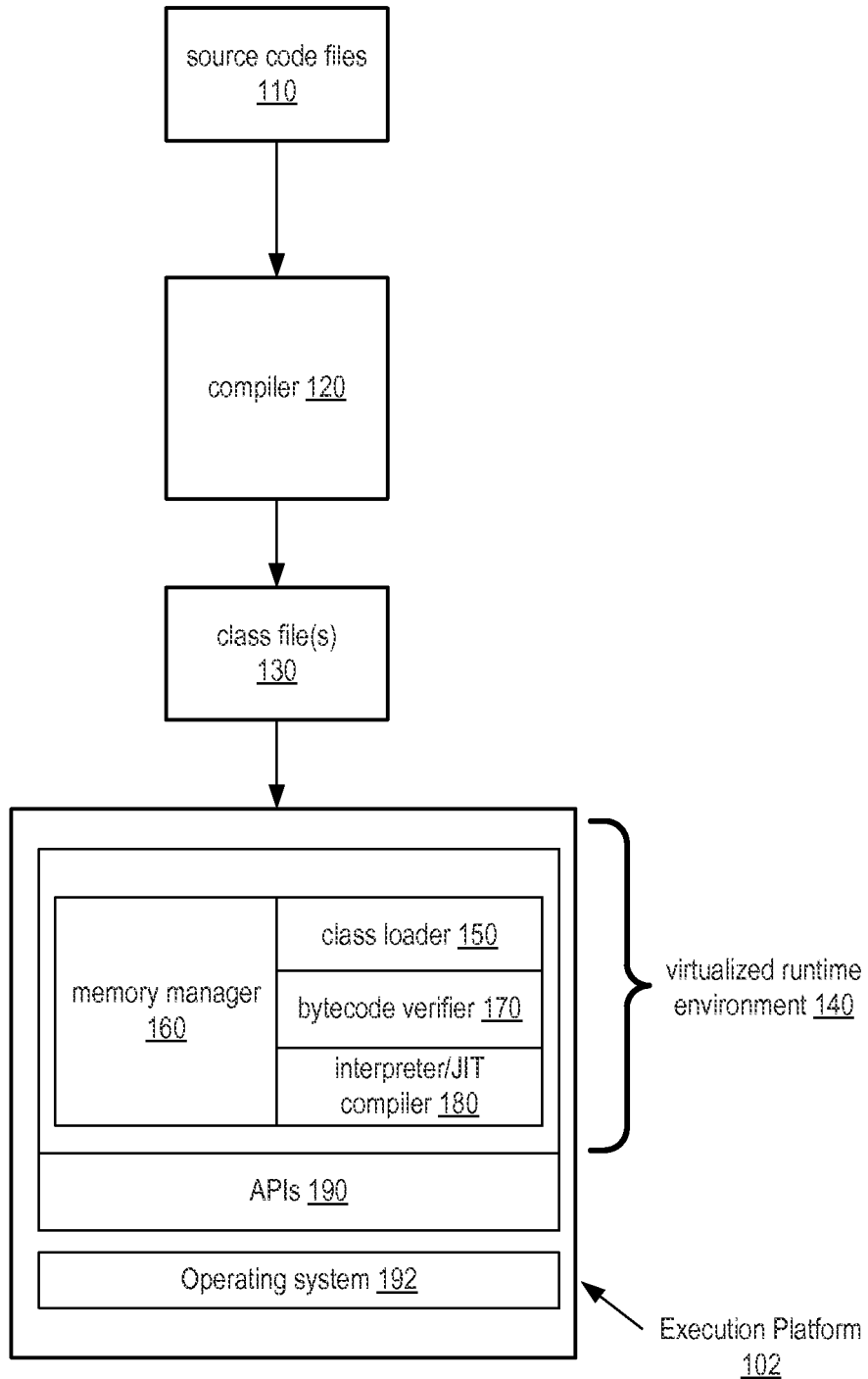
FIG. 1 is a logical block diagram illustrating a workflow for compiling and executing a computer program specified in a high-level object-oriented and that is configured to support structural descriptions of classes, according to various embodiments.

Described herein are various embodiments of enhancements to software development using a platform-independent, object oriented language, such as the Java™ programming language, to support various features, such as structural identification of dynamically generated, pattern-instantiation, generated classes using structural descriptions of classes.

According to some embodiments, the structural identification of dynamically generated, pattern-instantiation classes may be utilized using structural descriptions, such as to extend the way classes are described in a runtime environment. Instead of describing classes only by name, and using that name to find the class (e.g., in a class file on disk), a class may be referred to as a combination of a bytecode generator function plus some static arguments. In other words, in some embodiments, a class may be described by a structural description specifying a generator function (e.g., "Function from T to U", "array of T", "Tuple of T and U", "remote proxy for interface I", etc.) and possibly one or more parameters to that generator function. A structural description may, in some embodiments, be considered (e.g., may be used as) a class name for virtually any situation in which a class name is used.

For example, a structural description for a class may include a reference to a pattern (either by name or by reference to a class or method that implements it) and the parameters to the instantiation of the pattern. In some embodiments, a structural description may include information indicating a generator function and one or more parameters to that generator function. In some embodiments, two structural references may be considered the same class (or to reference the same class) if they have the same pattern and parameters. Thus, in some embodiments, class may be compared using their respective structural descriptions in the same manner in which classes are traditionally compared using their respective class names. In fact, in some embodiments, the structural description of a class may be considered, and may be used instead of, the name of the class and therefore classes may be compared using their class names, which may be structural descriptions.

In some embodiments, the generator function identified in a structural description of a class may be involved in the comparison of two classes. For example, a generator function may utilized (e.g., executed) in a manner that may allow the generator function to determine whether two instantiation are the same. Thus, in some embodiments, a generator function may be configured to participate in the judgment of "Am I the same instantiation as him", since in some cases the parameters to an instantiation might be commutative (e.g., a dynamic proxy for multiple interfaces) while in other cases they might not be. A structural description of a class may appear anywhere a class name could otherwise appear in a purely nominal VM (e.g., a VM not configured to support structural descriptions as class names), according to some embodiments. For example, a structural description of a class may appear as, or in place of, an argument type, a return type, a field type, a supertype, an operand of instanceof or a cast operator, and generally anywhere a class name may be used.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The methods and/or features described herein may involve various aspects of language development, such as (for example) including base support for describing dynamically derived classes in a Java Virtual Machine (JVM), translation mechanisms in the Java compiler for translating language-level concepts into bytecode that the JVM can execute, and features exposed in the Java language for expressing things that could not previously be expressed, according to various embodiments. Various embodiments of the methods, techniques, features and/or enhancements described herein are discussed in terms of the Java programming language and/or using features of software development using the Java programming language. However, the methods, techniques, features and other enhancements described herein may also be used with other programming languages, such as C, C++, C#, Scala®, Python, according to various embodiments.

Turning now to FIG. 1 which illustrates a workflow for compiling and executing a computer program specified in a high-level, platform independent, object-oriented language, and various methods, features and enhancements regarding structural descriptions of classes as described herein, according to various embodiments. For purposes of illustration, the following description is provided largely in the context of using the Java™ programming language. However, it is noted that the techniques described may be used with virtually any programming language that supports nominally-described, user-defined classes. In general, a class may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

According to the illustrated embodiment, the workflow may begin when a compiler, such as compiler 120, receives source code for a computer program, such as source code files 110. In various embodiments, source code files 110 may be specified in various high-level and/or platform independent, object-oriented programming languages, such as Java™ and/or other languages. For example, source code may be provided as a set of .java files in embodiments where Java™ is being used. In some embodiments, source code files 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

The compiler 120 may analyze the source code files 110 to produce an executable version of the program or bytecode files, such as class file(s) 130 (e.g., .class files or .jar files in the case of Java™) in the depicted embodiment. Different types of executable code formats may be used in various embodiments; for example, binary machine language may be used instead of bytecodes. In some scenarios, parts of the executable code in class file(s) 130 may be in bytecode while others are in a native binary machine language.

As part of compiling program source code files 110 into class file(s) 130, the compiler 120 may perform a sequence of analysis operations and generate various intermediate data structures before generating the executable version, such as to apply or implement structural descriptions of classes, according to some embodiments. For example, the compiler may add or include one or more structural descriptions of classes when creating class file(s) 130. As noted above, a structural description may include information indicating a generator function and one or more parameters to that generator function.

As illustrated in FIG. 1, class file(s) 130 may be passed to an execution environment, such as virtualized runtime environment 140, which executes the code on an execution platform 102, thereby creating various output data and/or behavior. The virtualized runtime environment 140 may in turn comprise a number of different components, such as a class loader 150, a memory manager 160, a bytecode verifier 170 (e.g., to check the validity of the executable code), and/or an interpreter and/or a just-in-time (JIT) compiler 180, according to various embodiments. The JIT compiler may in some embodiments be responsible for translating some or all of the bytecode (for example, heavily-used portions of bytecode) into platform-specific machine code to improve performance of the program execution. A virtualized runtime environment 140 may also include code to implement a number of application programming interface (API) libraries 190 in some embodiments. The virtualized runtime environment 140 may run on top of lower-level software such as an operating system 192 in some embodiments.

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

In some embodiments, virtualized runtime environment 140 may implement structural descriptions of classes using the class file(s) 130 generated by compiler 120. According to some embodiments, virtualized runtime environment 140 implementing structural descriptions of classes may, when loading a class, use a structural description from class file 130 (along with the parameters to the structural description) and may produce a new class which may be the result of applying the generator function (as specified in the structural description) to the parameters (also specified in the structural description).

Structural Identification of Dynamically Generated, Pattern-instantiation.

According to some embodiments, the structural identification of dynamically generated, pattern-instantiation classes may be utilized using structural descriptions, such as to extend the way classes are described in a runtime environment. Instead of describing classes only by name, and using that name to find the class (e.g., in a class file on disk), a class may be referred to as a combination of a code generator function plus some static arguments. In other words, in some embodiments, a class may be described by a structural description specifying a generator function and possibly one or more parameters to that generator function. A structural description may, in some embodiments, be considered (e.g., may be used as) a class name for virtually any situation in which a class name is used.

Thus, according to some embodiments, a software system, (e.g., a compiler and/or virtual runtime environment) may be augmented to allow describing a class by using a structural description that may encode a recipe or formula for generating the class. The structural description may include an identification of a generator function, such as a reference to a pattern (e.g., by name or by reference to a class or method that implements it) and the parameters, if any, for the generator function (e.g., parameters to the instantiation of the pattern).

Thus, a class which is the result of applying some generator function to some arguments may also be referred to using a structural description specifying a generator function and (possibly) one or more arguments, according to some embodiments. For example, in the case of specialization, that generator function may take, as arguments, a class to be specialized and its specialization arguments. Thus, a "synthetic class" in the constant pool may be referred to with a Tuple (e.g., generator=JavaGenericSpecializer, args=ArrayList, int). According to some embodiments, structural descriptions for synthetic classes may be utilized within source code, class files, and/or generated code.

In some embodiments, the generation of code for synthetic classes is performed by the runtime environment, such as when a class is resolved. As a result, synthetic classes may appear in the code anytime that a class is referred to. A structural description may be used for nearly any mechanical transformation or generation of classes, according to various embodiments. A few of the situations in which a structural descriptions may be used may include (among others):

Specialization (e.g., specializing List<T> to T=int)

A dynamic proxy for an interface

A forwarding proxy for an interface I, whose methods may delegate to an underlying instance of I A tuple type with specified component types A function type with specified argument and return types Frequently, source code (e.g., hand-written code) may include an instantiation of an existing pattern that could have been mechanically (e.g., automatically) generated from a description of the form "Instantiate the XYZ pattern with parameters A, B, and C".

Parameters to patterns may be other types or classes (e.g., "a Decorator around ActionListener") and mechanically (e.g., automatically) generating this code may, in some embodiments, be simpler and less error-prone than instantiating the pattern by hand, but more importantly, referring to the result declaratively ("a dynamic proxy for interface List") may be more clear, both in terms of reader clarity (e.g., to a person reading the code) and the ability of other components (e.g., within a VM or platform library code) to scrutinize a structural description of a class and determine information about its semantics.

Using structural descriptions as a fundamental way to describe classes may allow not only the generation of classes, but may also allow the use of structural description wherever a type would appear in a class file. For example, structural descriptions maybe used to implement: class foo extends Tuple<int, int>, an instanceof test (e.g., determining whether a particular element is a Tuple<int, int>), or to cast to Tuple<int, int>, among other examples. Thus, a VM may use the same class description as that used in the source language—in contrast to traditional programming languages, which may use one representation in the source language while generating name-mangled code for use at runtime.

Thus, structural descriptions may be considered, in some embodiments, a general mechanism for describing (and generating) classes. Additionally, using structural descriptions may also increase the expressivity of a runtime environment because a structural description may be used any place a class name might appear in a class file.

In some embodiments, use of structural descriptions may be considered as a layer of indirection for describing a class to be loaded. For example, instead of using class name as a path in a file system or as a key in a database to produce the class file to be loaded, a class is described (using a structural description) as a class that results from running a particular generator with certain parameters or as a class that results from transforming a class in a particular way.

Thus, rather than identifying a class by describing how to find the class by looking it up in the file system (e.g., by class name), a class is identified by a description of how to generate the class using a formula (or recipe) and then using an instantiation of the formula. In some embodiments, the combination of the particular formula (e.g., generator function) and the parameters to that formula are used instead of an actual name of the class in the class file. Thus, in addition to being able to refer to classes by name, classes may also be referred to by formula or recipe (e.g., by using a structural description). In other words, classes may be identified and/or referred to either nominally or structurally.

When a class identified by a structural description is to be loaded, the fact that the class is identified by a structural description may be recognized and the specific generator function may then be used to generate the class. In some embodiments, a structural description of a class may be considered (and used as) the only (e.g., the official) class name for that class. Thus, if two structural descriptions in two different classes both specify a dynamic proxy for List, a compiler or virtualized runtime environment may recognize that the two structural descriptions are for the same class and will reuse a class previously generated using one of the structural descriptions. In other words, a structural description of a class may be considered a concrete description of the class that may be compared with other structural descriptions, according to some embodiments.

For example, a dynamic class may be one generator function (or formula/recipe) which may take as input zero or more parameters. In some embodiments, one parameter to a generator function may be a class name of an existing class for which the code will be adapted (e.g., transformed by the generator function) in order to generate the new class. Additionally, in some embodiments, a structural description of a class can serve as an argument for another structural description, and thus may be passed as an argument to the generator function. In general, generator functions may take various types of parameters, including, but not limited to: method names, values, numbers, constants, class names, and/or structural descriptions for classes, according to various embodiments. The exact nature and types of input arguments to generator functions may vary from generator function to generator function and from embodiment to embodiment.

Thus, in some embodiments, structural descriptions may be used by some components based on their structure and not necessarily the specific meaning of individual parts of the description. For example, in one embodiment, a compiler may impart specific meaning to a structural description (e.g., the compiler know that the structural description is for generated a particular class), by emitting a specific generator function as part of the language's runtime library. However, other components many simply work with the structural description without requiring knowledge of the particular meaning of the individual parts of the description. For example, one or more components of a virtualized runtime environment may be configured to locate and execute generator functions specified by structural descriptions, without any particular knowledge regarding the details of the classes being generated, in certain situations and according to some embodiments.

Thus, in embodiments, the use of structural descriptions may be considered a feature provided by a virtualized runtime environment allowing a compiler to map source constructs to a reasonable runtime representation, without a user of the higher level language having to know what the runtime representation is (e.g.,—the programmer may only see the language's type system but not the runtime representation).

In some embodiments, use of structural descriptions may be considered part of a toolbox of features used to develop compilers so that the representation of user's programs can map to something that the runtime environment is able to efficiently manage. Implementing structural descriptions may involve multiple participants and multiple layers of indirection. For instance, the runtime environment may utilize structural descriptions to provide a natural representation for a language compiler so that when a programmer writes code in the high-level language, there may be a straightforward representational mapping, such as to possibly ensure good performance and predictable behavior.

In some embodiments, a virtualized runtime environment may be dynamically linked. Thus, if code from a particular class X invokes a method of another class Y, the compiler may retrieve the class file for class Y, generate a call to class Y, and put the signature in the class file for X. However, in order to the code to execute properly, at runtime the same class Y will need to have that same signature that the compiler used. Similarly, when utilizing structural descriptions, a class may be generated first (e.g., using a structural description), then examined at compile time. Then, the generated class may be discarded while the structural descriptions are retained in the code, in some embodiments. In order for the code to execute properly, at runtime the same generator function will have to generate the same signatures for a compatible class. Thus, when implementing structural descriptions, a compiler may not have to generate an entire class, but may be able to emit classes by only using structural descriptions.

In some embodiments, one or more pre-generated generator functions may be available, such as part of a language runtime library. In one Java-based example, structural descriptions may be used to generate Tuples and therefore a Tuple generator function may be provided in an appropriate runtime library, according to some embodiments. In some embodiments, a runtime library may include a Tuple generator class that may be used when a Tuple class needs to be generated. In such an example, a Java compiler may know exactly what the Tuple generator function is going to generate. In other embodiments, however there may be other generator functions that are part of another language's runtime that a particular compiler may not know (any details) about other than how to call particular generator functions specified in structural descriptions to generate a class (and then use the generated class as normal).

Similarly, a language may implement specialization using structural descriptions and therefore a specializer generator function (and/or a specializer generator class) may be provided within a runtime library, according to some embodiments.

In some embodiments, a runtime environment, such as virtualized runtime environment 140 may not know anything about the semantics of generator functions or the individual recipes, formulas or patterns being used. Instead, the runtime environment may simply use generator functions, as specified by structural descriptions, as code generators when a class needs to be loaded. For example, in one embodiment, a runtime environment may first execute the code generator (e.g., the generator function) to make the class and then use the class loader, such as class loader 150, to load that class. In other embodiments, a runtime environment may rely on the class loader to both execute the generator function and load the resulting class.

Thus, in some embodiments, the use of structural descriptions may be considered an agreement between a compiler and a runtime library regarding the generation of classes (e.g., based on structural descriptions) with the runtime environment possibly only understanding how to generate classes, without understanding the details of the specific classes and/or generator functions.

Representing classes as structural descriptions (e.g., such as parameterized instantiations of patterns) may offer programmers more expressiveness and readability, as it may be easier to both say and understand "dynamic proxy for List" than to create or comprehend the code that implements a dynamic proxy for List. Furthermore, not only is the code for using a pattern more compact and readable than instantiating that same pattern by hand, but it may also be more robust to change. For example, if a proxy for a class C is written by hand, and C is subsequently modified to have a new method, the hand-written proxy would not include that method. However, a proxy generated at runtime that chooses which methods to proxy by examining the target class at runtime would stay in sync with the class C.

Figure 2:
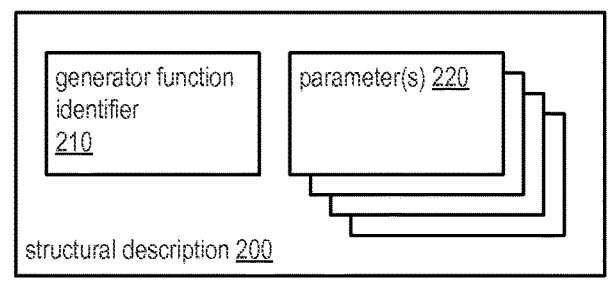
FIG. 2 is a logical block diagram illustrating a structural description of a class as descripted herein according to one embodiment.

FIG. 2 is a logical block diagram illustrating a structural description of a class as descripted herein according to one embodiment. As noted above, a class name may be represented by a structural description, such as structural description 200. For example, a runtime environment, such as virtualized runtime environment 140, may be configured to allow a class to be described by a structural description 200 that, in some embodiments, may be considered as encoding a recipe for generating the class. For instance, structural description 200 may include a generator function identifier 210 and one or more parameter(s) 220 for the generator function, as shown in FIG. 2.

Generator function identifier 210 may represent any of various manners of identifying a generator function, according to different embodiments. For example, in one embodiment, generator function identifier 210 may represent the name of a generator function configured to generate a class of a particular type using parameter(s) 220. In another embodiment, generator function identifier 210 may represent a reference to a class or method configured to implement that particular generator function. Thus, a generator function, as identified by generator function identifier 210 may represent a logical generator function or an actual programmatic function (or method), according to various embodiments.

For instance, in one embodiment, structural description 200 may include a reference to a pattern (e.g., either by name or by reference to a class or method that implements it) and the parameters to the instantiation of the pattern. Virtualized runtime environments, may refer to classes nominally (e.g., by class name). For instance, two class references may be considered the same if they have the same name. In some embodiments, classes may be generated based on the instantiation of a pattern. Such an instantiation may take arguments of various types.

For example, "a forwarding proxy for the X interface" or "a factory for the Y interface" may each represent a class to be generated based on an instantiation of a pattern. A structural description 200 for a class to be generated based on an instantiation of an example pattern of "a forwarding proxy for the X interface" may include a generator function identifier 210 that identifies a forwarding proxy generator function and may include parameter(s) 220 that represent the particular X interface, according to one example embodiment. Similarly, a structural description 200 for class to be generated based on an instantiation of an example pattern of "a factory for the Y interface" may include a generator function identifier 210 that identifies a factory generator function and may include parameter(s) 220 that represent the particular Y interface, according to one example embodiment.

Figure 3:
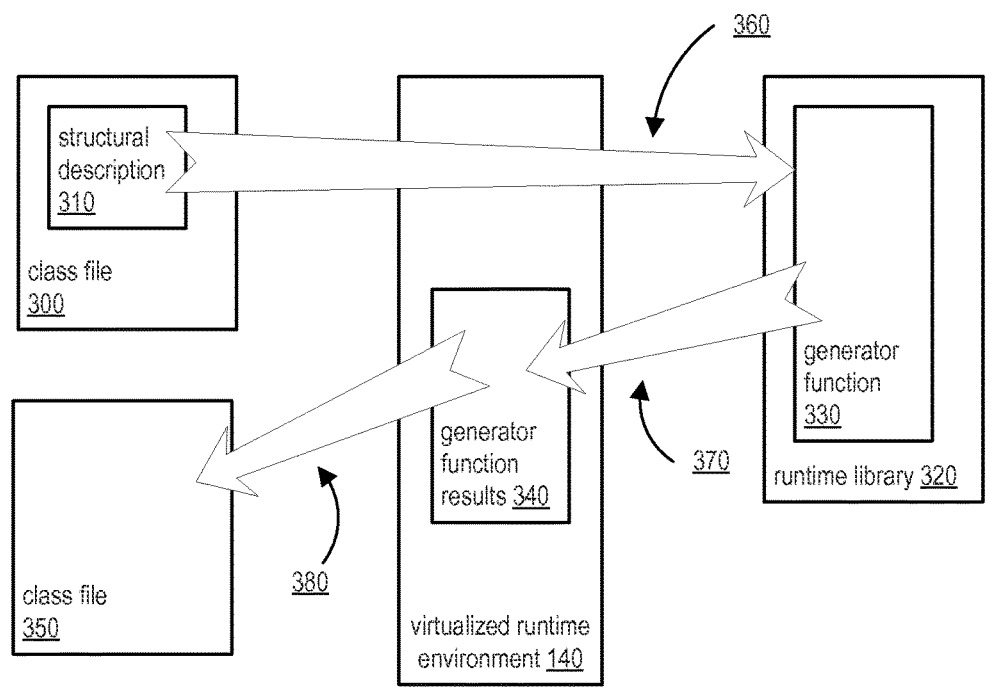
FIG. 3 is a logical block diagram illustrating the generation of a class based on a structural description, according to one embodiment.

As noted above, in some embodiments, classes may be generated based on a generator function (e.g., the instantiation of a pattern). FIG. 3 is a logical block diagram illustrating the generation of a class based on a structural description, according to one embodiment. As illustrated in FIG. 3, a virtualized runtime environment, such as virtualized runtime environment 140 (or a component of virtualized runtime environment 140, such as a class loader 150) may encounter (e.g., identify, discover, etc.) a structural description, such as structural description 310 in a class file 300. For example, virtualized runtime environment 140 may be executing code from class file 300 and may identify structural description 310 within the code of class file 300.

In order to generate the class described by structural description 310, virtualized runtime environment 140 may identify and locate the appropriate generator function, such as generator function 330. In some embodiments, virtualized runtime environment 140 may identify generator function 330 based on information within structural description 310, such as a generator function identifier discussed above. A generator function may be located in any of various locations, such as within a runtime library accessible to virtualized runtime environment 140, according to some embodiments. In some embodiments, generator function 330 may represent a method or class configured to generate a class based on a structural description.

Virtualized runtime environment 140 may be configured to execute generator function 330 in order to generate the class corresponding to structural description 310 and may pass one or more parameters from structural description 310 to generator function 330 (e.g. as arguments to the executed method. In one embodiment, rather than passing individual parameters to generator function 330, virtualized runtime environment 140 may be configured to pass structural description 310 as an argument to generator function 330. Generator function 330 may then utilize information in structural description 310 when generating a class corresponding to (e.g., described by) structural description 310. For example, generator function 330 may use one or more parameters from structural description 310.

Generator function 330 may generate results or output, such as generator function results 340, corresponding to, or usable to generate, a class described by structural description 310, according to various embodiments. For example, in one embodiment, generator function results 340 may be source code defining or declaring the class and the source code may be suitable for being compiled and/or otherwise used by virtualized runtime environment 140. In another embodiment, generator function results 340 may include already compiled code (e.g., such as byte code) for the class described by structural description 310. For instance, structural description 310 may describe a class that may be generated by a simple transformation of byte code from another, already-compiled, class and therefore generator function 330 may be able to provide an executable byte code version of the class to virtualized runtime environment 140.

Virtualized runtime environment 140 may be configured to utilize generator function results 340 in any of various ways, according to different embodiments. For example, in one embodiment, virtualized runtime environment 140 may be configured to store the generated class (e.g., based on generator function results 340) to a class file, either in memory or to disk.

While described above as being performed by a virtualized runtime environment, classes may also be generated by other components of a software development and/or execution environment, according to various embodiments. For example, in one embodiment, a compiler may be configured to generate classes based on structural descriptions, as will be discussed in more detail below regarding FIG. 4.

Figure 4:
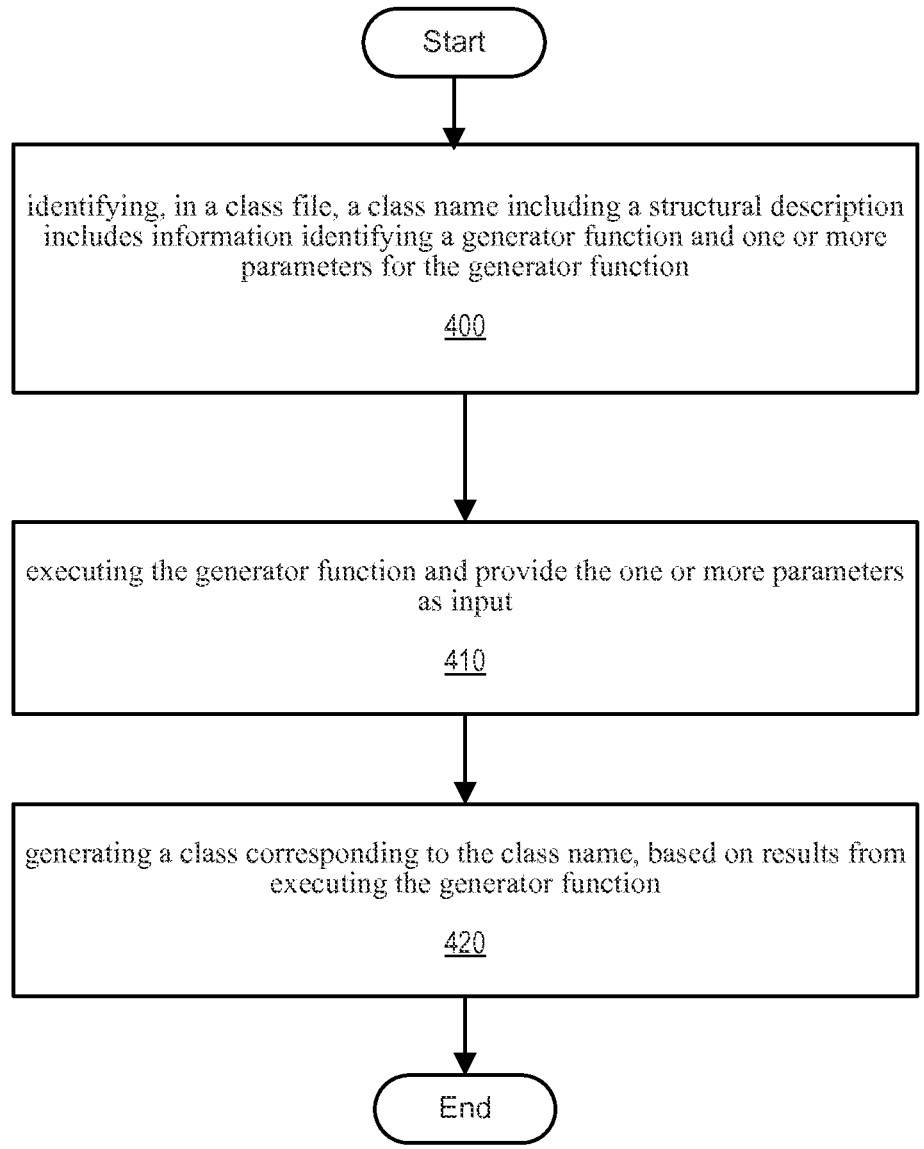
FIG. 4 is a flowchart illustrating one embodiment of a method for generating a class based on a structural description of the class, as described herein.

FIG. 4 is a flowchart illustrating one embodiment of a method for generating a class based on a structural description of the class, as described herein. As shown in block 400, a structural description may be identified in a class file and the structural description may include information identifying a generator function and one or more parameters for the generator function. For example, in one embodiment, a compiler 120 may be configured to identify a class described by a structural description, such as structural description 310 in class file 300, both described above regarding FIG. 3. While FIG. 3 illustrated the generation of a class by a virtualized runtime environment 140, in some embodiments, a compiler 120 may also be configured to perform class generation as described above in reference to virtualized runtime environment 140. In general, any of various components of a software development and/or execution environment may be configured to utilized structural descriptions of class, as described herein and according to various embodiments.

Returning now to FIG. 4, as shown in block 400, in one embodiment a compiler 120 may identify a structural description 310 within a class file 300. structural description 310 may include information identifying a generator function and one or more parameters for the generator function. For instance, two generator functions configured to generate a forwarding proxy class and an interface factory class, respectively, may each take one or more arguments representing the particular type of interface to be used with resulting class, according to example embodiments.

In some embodiments a compiler 120 may be configured to utilize structural descriptions as class names an may, after identifying a class (e.g., in a class file) that is described by a structural description, execute the generator function specified in the structural description and may provide one or more parameters as input arguments to the generator function, as illustrated by block 410. For example, compiler 120 may be configured to execute generator function 330 and pass one or more parameters as arguments to generator function 330. In general any suitable method of providing input parameters may be utilized when execution generator functions as part of implementing structural descriptions, according to different embodiments.

In some embodiments, rather than providing the individual parameters to the generator function, a structural description itself may be provided as input to the generator function, from which the generator function may obtain the individual parameters. For instance, compiler 120 may provide structural description 310 as an input argument when executing generator function 330, according to one example.

After executing the identified generator function, a compiler may also be configured to generate a class corresponding to the class described by the structural description based, at least in part, on results (e.g., output) from the generator function, as shown in block 420. For example, generator function 330 may generate generator function results 340 including information usable to create a class and compiler 120 may take generator function results 340 and create the corresponding class, such as by saving generator function results 340 to a class file 350, according to various embodiments.

As noted above, one example use of a structural description is to generate a class specialized (e.g., parameterized) for a particular data type. For example, a generator function may take, as arguments, a class to be specialized and its specialization arguments. For instance, the following example Box class may be specialized with T=int using a structural description.

```
class Box<T> {
    private final T t;
    public Box(T t) { this.t = t; }
    public T get( ) { return t; }
}
```

A compiler (and/or a component of a virtualized runtime environment) may encounter source code including a structural description indicating that the Box class should be specialized for T=int, such as may be represented by the example source code:
new Box<Integer> ( );

When the compiler encounters the above source code, it may recognize that the Box class should be specialized for T=int using a structural description specifying a specializer generator function and using the Box class and the type Integer (e.g. int) as parameters. Thus, the compiler may locate and execute a specializer generator function, passing (as arguments) parameters specifying the Box class (possibly the class name "Box" as one example) and the data type int. In response, the specializer generator function may generate source code implementing the Box class specialized for T=int, such as in the following example:

```
class Box$T=int extends java.lang.Object{
    private final int t;
    public Box$T=int(int);
    Code:
        0:  aload_0
        1:  invokespecial #1; //Method
    java/lang/Object."<init>":( )V
        4:  aload_0
        5:  iload_1
        6:  putfield #2; //Field t:int;
        9:  return
    public int get( );
    Code:
        0:  aload 0
        1:  getfield #2; //Field t:int;
        4:  ireturn
    }
```

The compiler may then take the results of the generator function (e.g., the generate class source code) and use it as required (e.g., compiler and/or save it in a class file, etc.).

Similarly, a compiler 120 may encounter within source code a structural description specifying a Tuple generator function and two parameters, such as represented by the following example code:
new Tuple<T1, T2>;

In the above example, the structural description includes the keyword "Tuple" along with two parameter types (e.g., T1 and T2) in parenthesis. In response to encountering the structural description, the compiler may execute a Tuple generator function passing the two types as input parameters. The results of the generator function may include additional source code implementing a Tuple class for the two types. For instance, if T1 in the above example represented an integer type and T2 in the above example represented a string type, the Tuple generator function may generate source code for implementing a Tuple with an integer and a string, as in the following example source code:

```
class Tuple$98456 {
    public final T1 _1;
    public final T2 _2;
    public Tuple$98456(T1 t1, T2 t2) { this._1 =
        t1; this._2 = t2; }
}
```

Compared with the specialize example above, the Tuple example illustrates how a generator function may generate new source code, rather than simply specializing a class supplied as input. In other embodiments, however, the above Tuple example may be implemented as a special case of a specializer generator function.

The code output by the generator function (e.g., the results of the generator function) may then be utilized by the compiler (e.g., it may be compiled and/or saved within a class file, etc.). In some embodiments, the resulting class generated by use of a structural description may not be seen (or be available) to a developer. Instead, it may be considered as internal to the system and used in place of the structural description. For instance, in the above Tuple example, a developer may use and refer to a Tuple<T1,T2> class (or objects) but may never see the internal Tuple$98456 representation generated in response to use of the structural description.

While described above in reference to a compiler, the method illustrated by FIG. 4 may be performed by any of various components of a software development or execution environment, such as by a virtualized runtime environment and/or by a class loader within a virtualized runtime environment.

Virtualized runtime environments, such as Java-based virtual machines (VMs) may refer to classes nominally (e.g., by name). Traditionally, classes may be referred to only by name, as in the following example partial constant pool dump:

Constant Pool:

| #3 = Class | #13 // java/lang/Object |
|---|---|
| #13 = Utf8 | java/lang/Object |

In the example above, a "Class" constant refers to a string constant that describes the class name. Various uses in the bytecode (superclass names, names of classes owning methods to be invoked, instanceof operands) may refer to a class nominally in this fashion.

Two class references may be considered the same if they have the same name. This may assume that each class has a unique, known, stable name, and may also usually require that each class be statically generated (by hand or machine) and stored in the file system. But there are many classes that may be better described (and compared) as instances of applying a particular generator function (e.g., a particular generation, transformation and/or pattern) to particular inputs or parameters.

Thus, in some embodiments, a class (e.g., in a class file) may be described using a structural descripting including a generator function that, when applied to its arguments, produces a class and (possibly) a set of arguments describing the instantiation desired. Rather than being compared for equality by their name, such structural classes may be compared for equality by having the same generator function and arguments.

In some embodiments, structural descriptions may be compared without calling the generator functions to generate the resulting class. Instead, structural descriptions may be compared structurally, such as by comparing their individual members. For example, if one structural description specifies using a dynamic proxy generator on a List class, and another also specifies using a dynamic proxy generator on a List class, they may be compared by first comparing the specified generator functions and if they are the same then comparing the particular parameters being passed to the respective generator functions.

Figure 5:
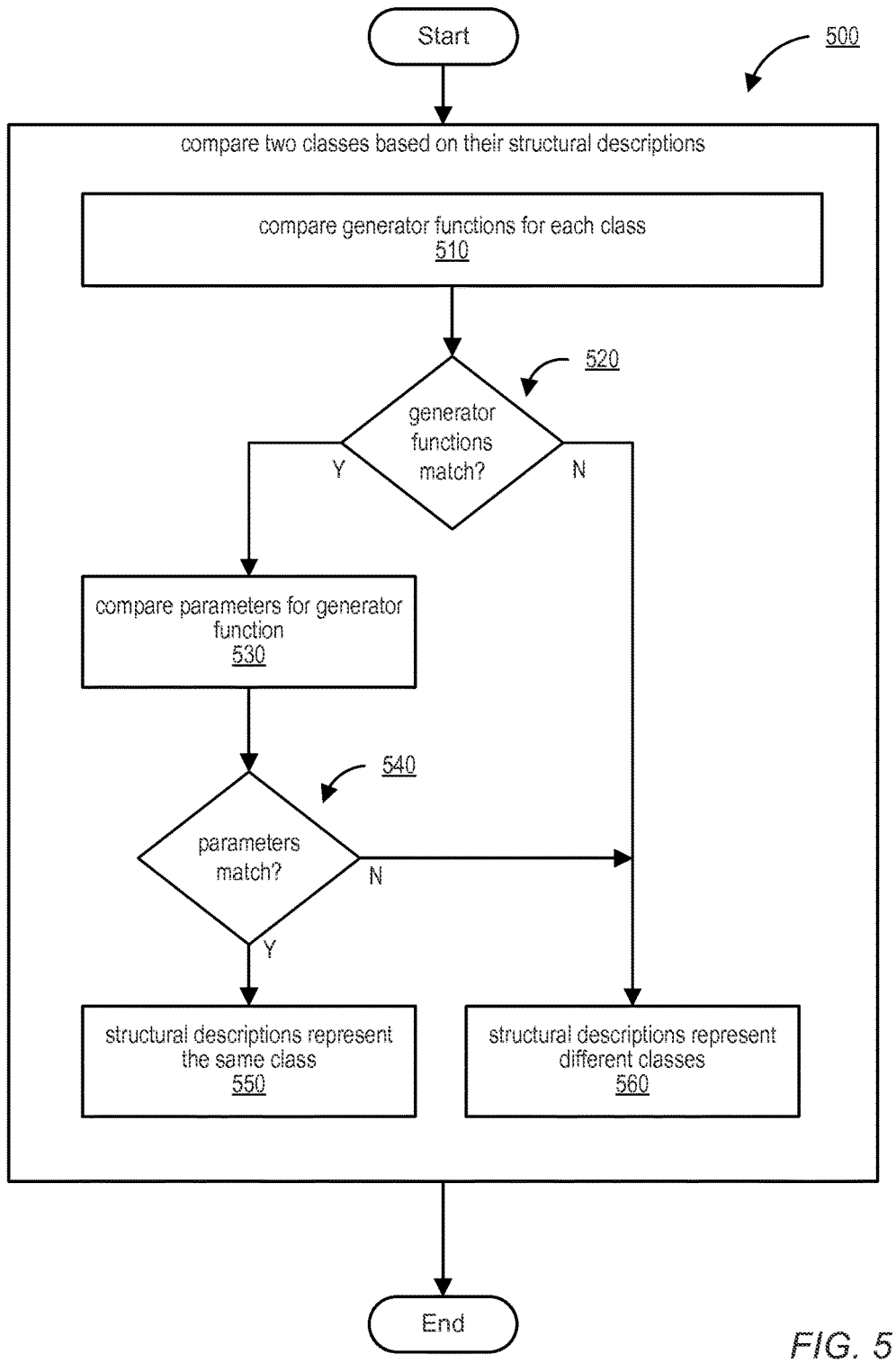
FIG. 5 is a flowchart illustrating one embodiment of a method for comparing two classes based on their structural description, as described herein.

Additionally, according to some embodiments, two classes may be compared based on their respective structural descriptions. FIG. 5 is a flowchart illustrating one embodiment of a method for comparing two classes based on their structural descriptions, as described herein. For example, two structural descriptions (e.g., two structural references to patterns) may be considered to be (or to represent) the same class if they utilize the same generator function and parameters (e.g., the same pattern and parameters).

As shown in block 500, comparing two classes based on their structural descriptions may include comparing generator functions for the two classes, as shown in block 510. For example, in one embodiment, compiler 120 may be configured to compare two classes' generator functions by comparing the information in the structural descriptions that identify the generator functions. For instance, if two structural descriptions include the name of a generator function and the both include the same name, the two structural descriptions may be considered to identify the same generator function, according to one embodiment.

If, as indicated by the positive output of decision block 520, the two generator functions are the same (e.g., both structural descriptions identify the same generator function), then the parameters for the generator function may be compared, as shown in block 530. For instance, according to some embodiment, two classes may be considered different if they are based on passing different parameters to the same generator function. For example, two classes both based on a Tuple generator function may be considered different if they pass different parameters to the generator function (e.g., one specifies two integers, while the other specifies a string and an integer as parameters).

If, as indicated by the positive output of decision block 540, the parameters specified by the two structural descriptions are the same, then the two structural descriptions may be considered to represent the same class, as in block 550. If, however, the generator functions are not the same, as indicated by the negative output of decision block 520, or the parameters do not match, as indicated by the negative output of decision block 540, the two structural descriptions may be considered to represent two different classes, as in block 560.

According to some embodiments, the individual parts of a structural description (e.g., generator function identifier, parameters) may be compared but the resulting classes may not be generated. In some embodiments, individual comparisons made as part of comparing two structural descriptions may involve comparing things nominally (e.g., textually, by name), but in other embodiments they may not. For instance, in one embodiment, generator functions may be specified by name within structural descriptions and therefore generator function identifiers may be compared nominally (e.g., since they are generator function names). In other embodiments, the individual parts of structural descriptions may be compared in other manners, (e.g., by comparing numbers, references, etc.).

In some embodiments, comparing the individual part of two structural descriptions may be performed only by library functions and/or library classes rather than having programmers/developers compare individual parts of structural descriptions.

In some embodiments, the generator function may be allowed to participate in the comparison of classes using their structural descriptions. For example, a generator function indicated in a structural description may be allowed to participate in the judgment of whether two classes are the same. Thus, in some embodiments, when comparing two classes based on their structural descriptions, a compiler 120 may be configured to call a method associated with a generator function identified in one of the structural descriptions for the classes being compared. The compiler may pass one or more of the structural descriptions being compared to the called method and the method may then determine (e.g., such as by comparing the information in the structural descriptions) whether the structural description represent the same class or not.

For instance, in some cases the parameters to a generator function (e.g., to an instantiation of a pattern) might be commutative (e.g., a dynamic proxy for multiple interfaces) while in other cases they might not be. Such a structural description (e.g., of a pattern-instantiation) may appear anywhere a class name could otherwise appear. For example, a structural description of a class may appear as, or as part of, an argument type, a return type, a field type, a supertype, an operand of instanceof or a cast operator, or virtually anywhere else a class name may be used.

Figure 6:
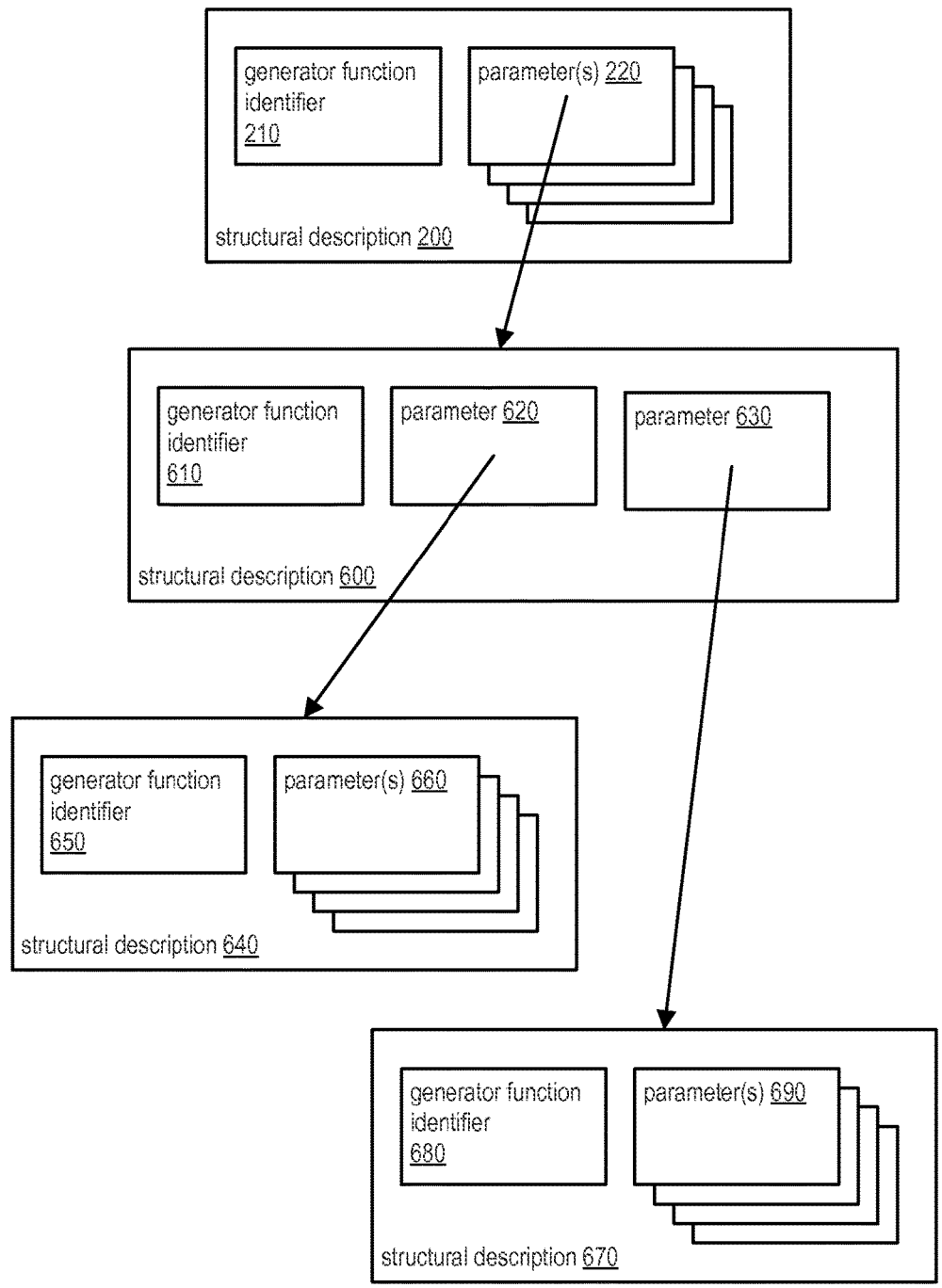
FIG. 6 is a logical diagram illustrating structural descriptions used recursively, according to one embodiment.

In some embodiments, use of structural descriptions may be recursive. For instance, one or more of the parameters to be used as input to a generator function when generating a class may be structural descriptions for classes. FIG. 6 is a logical diagram illustrating structural descriptions used recursively, according to one embodiment. As shown in FIG. 2, a structural description, such as structural description 200, described above, may include a generator function identifier and one or more parameters for the identified generator function. In some embodiments, one or more of the parameters to a generator function may be classes and those classes may be represented (e.g. described) by structural descriptions. Thus, parameter 220 of structural description 200 may be (or may represent) structural description 600, according to one example embodiment. structural description 600 may include generator function identifier 610 and one or more parameters.

Generator function identifier 610 may identify the same or a different generator function as that identified by generator function identifier 210, according to different embodiments. Thus, in some embodiments, generator functions (or classes representing generator functions) may be configured to be executed recursively.

When generating the class represented by structural description 200, a compiler 120 may be configured to first generate the class represented by structural description 600 and then pass that class as one an input to the generator function for structural description 200. Thus, in some embodiments, a compiler 120 may be configured to examine all the parameters of a structural description in order to determine whether or not any of them represent classes to be generated. In other embodiments, the generator functions themselves may be configured to recognize that an input parameter may be a structural description and may be further configured to generate a class based on that structural description and use that generated class as input for generating its own class.

A series of structural descriptions, such as illustrated by FIG. 6, may include multiple layers of recursion. For example, parameter 620 of structural description 600 may be (or may reference) structural description 640 which may include generator function identifier 650 and parameter(s) 660. Generator function identifier 650 may represent the same generator function as identified by generator function identifier 210 or may represent the same generator function as identified by generator function identifier 610 or may represent a different generator function. Similarly, parameter 630 of structural description 600 may be (or may reference) structural description 670 which may include generator function identifier 680 and parameter(s) 690.

Furthermore, comparing classes using structural descriptions, may involve recursion through multiple layers of structural descriptions, according to various embodiments. For example, individual parameters specified by one or more of the structural descriptions might themselves be structural descriptions. Therefore, comparison may require recursing through multiple layers of structural descriptions until the individual parameters are not themselves structural descriptions. If, the two original structural descriptions being compared include the same layers of structural descriptions specifying the same generator functions and parameters at each layer of recursion, then the two original structural descriptions (and hence the two original classes) being compared may be considered the same.

In general, structural descriptions may be used for virtually any mechanical transformation from one type to another. For example, structural descriptions may be utilized for specializing a generic class List<T> for T=int, implementing dynamic proxies for one or more interfaces, implementing forwarding proxies for one or more interfaces, implementing classes representing Tuples with given component types; as well as for implementing classes representing structural function types for given argument and return types, according to various embodiments.

Examples of situations suitable for using structural descriptions, according to various embodiments, may include:

Generic Specialization

One example of a transformation suitable for using structural descriptions may include implementing generic specialization. When implementing specialization using structural descriptions, a generator function may take as an argument a class to be (partially or wholly) specialized and the specialized type arguments to be used for specialization. For example, a structural description specifying that List<T> be specialized with T=int", may produce a class that is the result of transforming the class List<T> by changing the annotated signatures and instructions according to the specialization rules, and leaving everything else unchanged.

Thus, one generator function provided by a runtime library may be a specializer function whose arguments may specify a class to specialize and the specializations of the type arguments. For example, if an ArrayList of int is to be generated, a structural descripting specifying the generation of the dynamic class that results from executing the specializer generator function with ArrayList and int as arguments. In some embodiments, a specializer generator function may read the class file of the class to be specialized and generate a new class file. Using the structure of the old class file, the specializer generator function may pass some items through directly to the new class file, while replacing use of object with int, such as to specialize the type of method signatures, fields, etc., according to some embodiments.

Dynamic Proxy for Interfaces

Another example of a transformation suitable for using structural descriptions may include implementing a dynamic proxy for one or more interfaces, according to some embodiments. For instance, the generator function may take as arguments a set of interfaces to proxy, and may produce a class that implements all those interfaces, whose methods dispatch to an invocation handler which is passed to the constructor of the resulting class. Thus, a structural description specifying the generation of a dynamic proxy may including an identification of a dynamic proxy generator function and may specify one or more interface types as parameters, according to one embodiment.

For example, a developer may desire to implement an instance of a class that implements the List interface, such that when a get method of the class is called, a handler method is also called indicating what parameters where used in the call to the get method (e.g., so that the get method calls may be intercepted). In other words, a developer may desire to implement a dynamic proxy for the List interface.

In order to implement a dynamic proxy, a structural description may specify the interface (e.g., the List interface) as a parameter to be used when executing a dynamic proxy generator function.

Forwarding Proxy for Interfaces

Similarly, structural descriptions may be used to implement a forwarding proxy for one or more interfaces, according to some embodiments. For instance, the generator function may take as parameters a set of interfaces to proxy, and may produce a class that implements all these interfaces, such as to implement network or remote proxy classes (e.g., for use with Corba, or Enterprise Java Beans, or Remote Method Invocation, etc.).

Rather than dispatching to an invocation handler, as described above regarding dynamic proxies, method calls may be forwarded to an underlying object that implements these interfaces, and which may be provided to the constructor of the resulting class. Thus, a structural description may specify a forwarding proxy generator function and one or more interfaces as parameters.

Tuple Types

Another example of a transformation suitable for using structural descriptions may include a tuple type with specified component types, according to some embodiments. For instance, a Tuple generator function may be provided that takes as arguments the types of the fields and that outputs a class that represents that particular Tuple and that has members of the specified types.

For example, a developer may write source code implements a Tuple for two data types, T1 and T2 such as in the following example:

new Tuple<T1, T2>;

The compiler may use a structural description specifying a Tuple generator function and the types, T1 and T2 as parameters. For instance, the structural description may include a keyword identifying the particular generator function (e.g., "Tuple") along with two parameter types (e.g., T1 and T2). At runtime, when the structural description is used, the runtime environment may identify, locate and execute the generator function passing the two data types as arguments. The Tuple generator function may then output bytecode defining a Tuple class using the two specified data types, as in the following example code:

```
class Tuple$98456 {
    public final T1 _1;
    public final T2 _2;
    public Tuple$98456(T1 t1, T2 t2) { this._1 =
    t1; this._2 = t2; }
}
```

Narrowing Proxy

Another example of a transformation suitable for using structural descriptions may include a narrowing proxy. For example, a class C may implement interface I. Class C may be passed to some other method, but it may be desired that only the methods of interface I been visible (i.e., it may be undesirable for C to be downcast to some other type).

Traditionally, a manual adapter would be written, as in the following example code:

```
class IAdapter implements I {
    private final I underlying;
    public IAdapter(I underlying) { this.underlying =
    underlying; }
    public void iMethod1(int arg) {
    underlying.iMethod1(arg); }
    ...
}
```

In some embodiments, a generator function may be written which takes, as an argument, the class I, and that generates IAdapter. By this mechanism, there may no longer be a need to write the adapter for each I by hand, but instead they may be generated as needed using structural descriptions. For example, a structural description may specify a narrowing proxy generator function and the class I as a parameter. When executed the narrowing proxy generated may generate the IAdapter class, as in the example above.

Introspection of Generated Classes at Compile Time

Additionally, classes may be introspected at compile time, in some embodiments. For example, when "class Foo extends List<int>", List<int> is dynamically generated, the compiler may have to then run the generator to identify List<int>'s members, and uses that to make compilation decisions. The same class may be re-specialized at subsequently runtime.

Additionally, if/when "class Foo extends List<int>", where List<int> is implemented using a structural description (e.g., represented as the instantiation of a pattern rather than a nominal class), the compiler may need to know the structure and members of the superclass, in some embodiments. For example, compiler 120 may then execute the corresponding generator function to generate the List<int> class, introspect over it reflectively, and gather the required data. The specialized class may then be re-generated at runtime when it is actually used.

Reflection Over Generated Classes

A generated class may have an "ugly" (e.g., complicated) name (or no name). However, users may wish to reflect over this class. Thus, in some embodiments, the generated (e.g., complicated or "ugly") name may be reconnected to a reflective view of the compile-type static type system. Furthermore, a human-readable (e.g., human friendly) description of the name of a generated class may be reconstructed, even though the class may actually have a more complicated name, such as Generated$List$$23$T=int, for example.

In some embodiments, implementing structural descriptions may provide a method of connecting a generated class back to the particular generator (e.g., the particular transformation, recipe, formula, etc.) used to create it. Thus, in some embodiments, a structural description may provide a way of rendering in a human-readable, textual form, the particular generator used. Additionally, in some embodiments, implementing structural descriptions may also provide a mechanism for mapping a particular structural description back into the type system of the language originally used. For example, while a runtime environment may provide structural descriptions as a low-level mechanism for referring to classes, a high-level language (e.g., Java) may provide a type system and may use structural descriptions as a way of representing various types of the high-level language.

When utilizing a reflection mechanism, it may be desirable to have every type in the high-level language be describable in the reflection layer in a way that maps to the high-level language's type system (which may be different from the type system used by the runtime environment). Thus, in some embodiments, a language-specific mapping of the language's native type system to structural descriptions may be reversed so that a type in the structural description may be connected back to the original type system (e.g., of the high-level language).

Please note that while the above discussion has described manual changes being made to classes, methods, etc., a compiler, such as compiler 120, or a virtualized runtime environment, such as virtualized runtime environment 140, both described above, may also be configured to understand, analyze or otherwise process, the features described above as being manually performed. For example, while the sections above regarding manual refinement of classes and method may refer to manually adding or modifying classes or methods, a compiler or virtual may be configured to accept and process the manually modified code (or bytecode), such as to properly specialize a class for example. In general, while various methods, features and/or enhancements may be described herein using manual modifications to code, such descriptions are for ease of explanation and the implementation of such methods, features and/or enhancements may also involve a compiler and/or virtual machine.

While described above mainly in reference to static-only types, the methods, features and/or enhancements described herein, are not limited to static-only types. In some embodiments, the methods, features and/or enhancements described herein, may also be applied to dynamic types. For example, checked but underspecialized expressions such as List<???> ls= . . . ; Number n=ls.sum( ) (e.g., in which some sort of runtime exception would apply if the type parameter of the list violated the type bounds) may also be performed via the methods, features and/or enhancements described herein.

Figure 7:
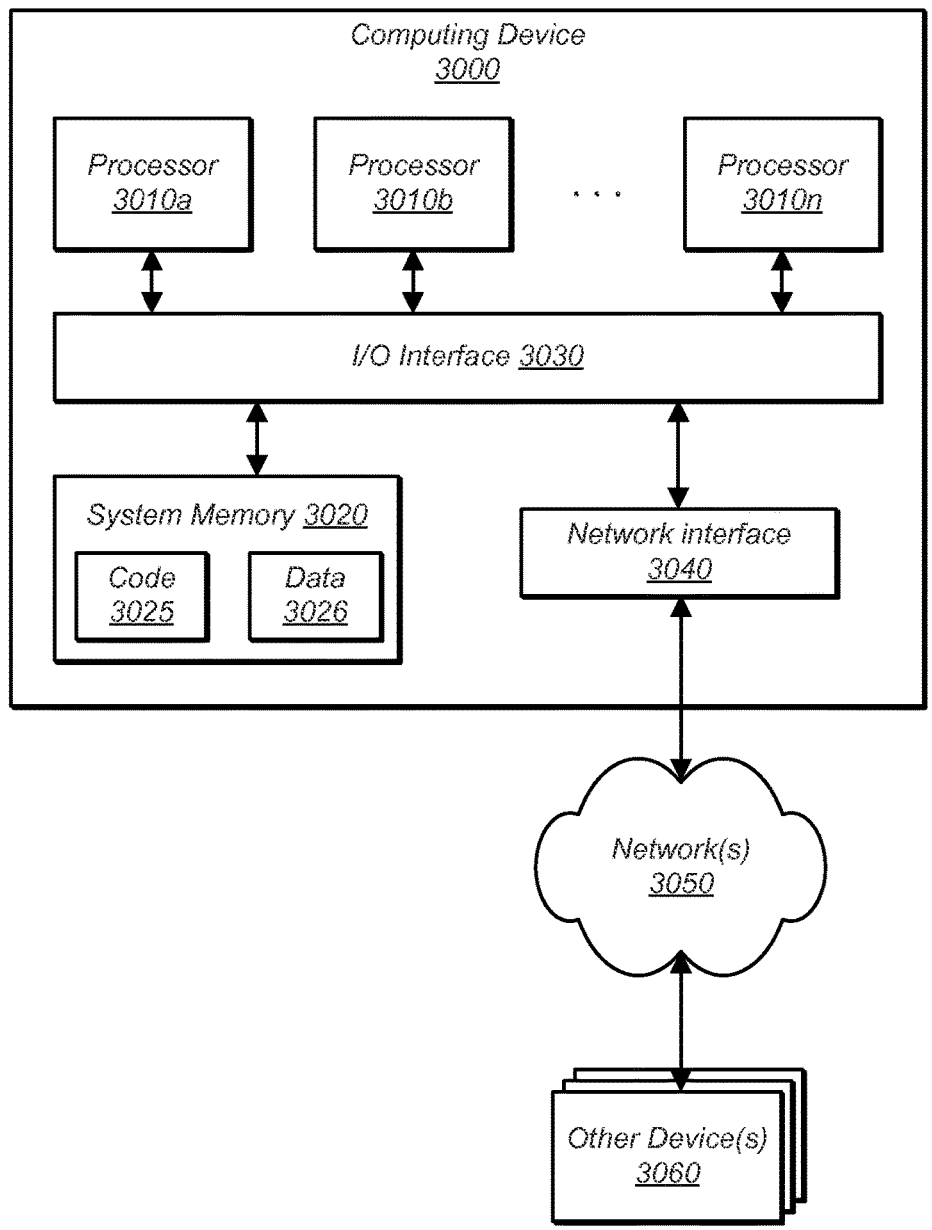
FIG. 7 is a logical block diagram illustrating an example computer system suitable for implementing structural identification of dynamically generated, pattern-instantiation, generated classes using structural descriptions, according to one embodiment.

In at least some embodiments, a computer system that implements a portion or all of one or more of the technologies described herein may include a general-purpose computer system that includes or is configured to access one or more computer-readable media. FIG. 7 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing compiler 120 and/or virtualized runtime environment 140, described above.

In various embodiments, compiler 120 and/or virtualized runtime environment 140 (and/or any individual sub-modules thereof) may each be implemented in any of various programming languages or methods. For example, in one embodiment, compiler 120 and/or virtualized runtime environment 140 may be written in any of the C, C++, assembly, JAVA or other general purpose programing languages, while in another embodiment, one or more of them may be written using a different, more specialized, programming language. Moreover, in some embodiments, compiler 120 and/or virtualized runtime environment 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by Compiler 120 may, in some embodiments, be performed by virtualized runtime environment 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
   identifying, in a class file, a class name comprising a structural description describing a new class identified by the class name, wherein the structural description comprises information identifying a generator function and one or more parameters for the generator function;
   executing the generator function identified by the structural description, wherein said executing comprises providing the one or more parameters identified by the structural description as input to the generator function;
   generating the new class based, at least in part, on results from said executing the generator function, wherein the new class is not loadable prior to said generating;
   identifying another structural description, wherein the other structural description comprises information identifying another generator function and one or more other parameters for the other generator function; and determining whether the structural description and the other structural description represent two equivalent classes based, at least in part, on a comparison between the structural description and the other structural description and a comparison between the one or more parameters and the one or more other parameters.

2. The non-transitory, computer-readable storage medium of claim 1, wherein said identifying, said executing and said generating are performed at compile time by a compiler of a platform independent, object oriented language.

3. The non-transitory, computer-readable storage medium of claim 1, wherein said identifying, said executing and said generating are performed at runtime of a platform independent, object oriented runtime environment.

4. The non-transitory, computer-readable storage medium of claim 1, wherein said executing comprises loading the generator function from a runtime library.

5. The non-transitory, computer-readable storage medium of claim 1, wherein one of the one or more parameters comprises another structural description, wherein the other structural description comprises information identifying another generator function and one or more other parameters for the other generator function, wherein said executing further comprises:
  executing the other generator function, wherein said executing the other generator function comprises providing the one or more other parameters as input to the other generator function; and
  providing results from said executing the other generator function as input to the generator function.

6. The non-transitory, computer-readable storage medium of claim 1, wherein the structural description specifies a specializer function to be applied to at least one of the one or more parameters; and wherein said executing the generator function further comprises applying the specified specializer function to the at least one parameter.

7. The non-transitory, computer-readable storage medium of claim 1, wherein said executing further comprises:
  generating source code configured to implement the new class; and
  compiling the generated source code.

8. The non-transitory, computer-readable storage medium of claim 7, wherein said executing further comprises storing the generated source code in a new class file.

9. The non-transitory, computer-readable storage medium of claim 1, wherein the program instructions further cause the computing device to perform:
  loading the new class; and
  instantiating an instance of the new class;
  wherein said loading and said instantiating are performed subsequent to said generating.

10. A method, comprising:
  identifying, by a compiler or a platform independent, object oriented runtime environment implemented on one or more computing devices, a class name in a class file, wherein the class name comprises a structural description describing a new class identified by the class name, wherein the structural description comprises information identifying a generator function and one or more parameters for the generator function;
  executing, by the compiler or the platform independent, object oriented runtime environment, the generator function identified by the structural description, wherein said executing comprises providing the one or more parameters identified by the structural description as input to the generator function;
  generating, by the compiler or the platform independent, object oriented runtime environment, the new class, wherein said generating is based, at least in part, on results from said executing, and wherein the new class is not loadable prior to said generating;
  identifying, by the compiler or the platform independent, object oriented runtime environment, another structural description, wherein the other structural description comprises information identifying another generator function and one or more other parameters for the other generator function; and
  determining, by the compiler or the platform independent, object oriented runtime environment, whether the structural description and the other structural description represent two equivalent classes based, at least in part, on a comparison between the structural description and the other structural description and a comparison between the one or more parameters and the one or more other parameters.

11. The method of claim 10, wherein said identifying, said executing and said generating are performed at compile time by the compiler, and wherein the class file is based on a platform independent, object oriented language.

12. The method of claim 10, wherein said identifying, said executing and said generating are performed at runtime of the platform independent, object oriented runtime environment.

13. The method of claim 10, wherein said executing comprises loading the generator function from a runtime library.

14. The method of claim 10, wherein one of the one or more parameters comprises another structural description, wherein the other structural description comprises information identifying another generator function and one or more other parameters for the other generator function, wherein said executing further comprises:
  executing, by the compiler or the platform independent, object oriented runtime environment, the other generator function, wherein said executing the other generator function comprises providing the one or more other parameters as input to the other generator function; and
  providing, by the compiler or the platform independent, object oriented runtime environment, results from said executing the other generator function as input to the generator function.

15. The method of claim 10, wherein the structural description specifies a specializer function to be applied to at least one of the one or more parameters; and wherein said executing the generator function further comprises applying, by the compiler or the platform independent, object oriented runtime environment, the specified specializer function to the at least one parameter.

16. A computing device, comprising:
  a processor; and
  a memory comprising program instructions, that when executed on the processor cause the processor to:
    identify, in a class file, a class name comprising a structural description describing a new class identified by the class name, wherein the structural description comprises information identifying a generator function and one or more parameters for the generator function;
    execute the generator function identified by the structural description, wherein to execute the generator function the program instructions further cause the processor to provide the one or more parameters identified by the structural description as input to the generator function;

generate, based at least in part on results from executing the generator function, the new class, wherein the new class is not loadable prior to said generating;

identify another structural description, wherein the other structural description comprises information identifying another generator function and one or more other parameters for the other generator function; and determine whether the structural description and the other structural description represent two equivalent classes based, at least in part, on a comparison between the structural description and the other structural description and a comparison between the one or more parameters and the one or more other parameters.

17. The computing device of claim 16, wherein the program instructions are executable on the processor to implement a compiler for a platform independent, object oriented language, wherein the compiler is configured to perform said identifying, said executing and said generating at compile time.

18. The computing device of claim 16, wherein the program instructions are executable on the processor to implement a platform independent, object oriented runtime environment, wherein said identifying, said executing and said generating are performed at runtime of the platform independent, object oriented runtime environment.

19. The computing device of claim 16, wherein one of the one or more parameters comprises another structural description, wherein the other structural description comprises information identifying another generator function and one or more other parameters for the other generator function, wherein to execute the generator function, the program instructions further cause the processor to:

execute the other generator function, wherein to execute the other generator function, the program instructions further cause the processor to provide the one or more other parameters as input to the other generator function; and provide results from said executing the other generator function as input to the generator function.

20. The computing device of claim 16, wherein the structural description specifies a specializer function to be applied to at least one of the one or more parameters; and wherein to execute the generator function, the program instructions further cause the processor to apply the specified specializer function to the at least one parameter.

* * * * *